United States Patent
Lawson, II

(10) Patent No.: US 9,997,976 B2
(45) Date of Patent: Jun. 12, 2018

(54) FAILURE MODE PROTECTION FOR ELECTROMECHANICAL BATTERY

(71) Applicant: Robert W. Lawson, II, Detroit, MI (US)

(72) Inventor: Robert W. Lawson, II, Detroit, MI (US)

(*) Notice: Subject to any disclaimer, the term of this patent is extended or adjusted under 35 U.S.C. 154(b) by 362 days.

(21) Appl. No.: 14/973,255

(22) Filed: Dec. 17, 2015

(65) Prior Publication Data
US 2017/0179788 A1    Jun. 22, 2017

(51) Int. Cl.
H02K 7/102 (2006.01)
H02K 7/02 (2006.01)
H02K 1/27 (2006.01)
H02K 5/04 (2006.01)

(52) U.S. Cl.
CPC ............ H02K 7/102 (2013.01); H02K 1/278 (2013.01); H02K 5/04 (2013.01); H02K 7/025 (2013.01)

(58) Field of Classification Search
CPC ........ H02K 7/102; H02K 7/025; H02K 1/278; H02K 5/04; H02K 1/27; H02K 7/02; H02K 7/09; F16C 32/0493; F16C 39/063; H01M 14/00
USPC .......................................................... 310/74
See application file for complete search history.

(56) References Cited

U.S. PATENT DOCUMENTS

| 4,926,107 A | 5/1990 | Pinson |
| 5,705,902 A | 1/1998 | Merritt |
| 6,122,993 A | 9/2000 | Morris et al. |
| 6,585,490 B1 | 7/2003 | Gabrys |
| 6,753,619 B2 | 6/2004 | Stevenson |
| 6,798,092 B1* | 9/2004 | Gabrys ............... H02K 7/025 310/43 |
| 7,381,460 B2 | 6/2008 | Palmer |
| 7,541,783 B2 | 6/2009 | Kurosawa |
| 8,134,264 B2 | 3/2012 | Han |
| 8,698,365 B2 | 4/2014 | Hill |
| 2001/0036565 A1* | 11/2001 | Jennings ............ F16C 32/0493 429/10 |
| 2010/0283340 A1* | 11/2010 | Fradella ................ H02K 7/025 310/74 |

(Continued)

FOREIGN PATENT DOCUMENTS

WO    WO 9532541 A1 * 11/1995    .......... F16C 32/0438

Primary Examiner — Naishadh Desai
(74) Attorney, Agent, or Firm — Wayne Law School Patent Clinic

(57) ABSTRACT

An electromechanical battery can include a rotary member made at least in part of a first material composition. The rotary member having an interior surface defining an internal core cavity and at least one central chamber. A plurality of permanent magnets supported by the interior surface of the core cavity. A core member can be disposed within the core cavity. At least one levitating magnet can be supported by an exterior surface of the core member. The rotary member levitated with respect to the core member by the permanent magnets and levitating magnet. A second material composition can reside within at least one of the rotary member and the core member. The first member material composition converts through chemical reaction when exposed to the second material composition into a third material composition. The third material composition characterized by energy absorption resisting continued rotation of the rotary member.

20 Claims, 4 Drawing Sheets

(56) References Cited

U.S. PATENT DOCUMENTS

2012/0139375 A1* 6/2012 Masuzawa .......... F16C 32/0465
310/90.5

* cited by examiner

FAILURE MODE PROTECTION FOR ELECTROMECHANICAL BATTERY

FIELD OF INVENTION

The present invention relates generally to an electromechanical battery (EMB), and more particularly, to energy absorption for failure mode protection of an electromechanical battery.

BACKGROUND

Electromechanical batteries (EMB) have been considered as alternative energy storage systems in the automotive industry. Generally, an EMB, such as a flywheel has been used to store energy with the use of an electric motor. Traditional flywheel electromechanical batteries include an electric motor which spins a rotor at high rotational speeds to store energy and the energy is then discharged by driving an electric generator with the spinning flywheel when power is needed. The rotor can be rotated within a housing unit through a combination of electrical current and magnets. One problem with high rotational speed spinning rotors being used to store energy relates to failure modes, where the electromechanical battery is subject to being impacted during a collision, or where a spinning rotor fails for some other reason. The high rotation speed of the rotor stores a large amount of stored energy and consequently requires safeguards for disposal or dissipation of the stored residual energy. This residual energy needs to be quickly released and absorbed almost immediately in response to failure of the electromechanical battery.

Examples of electromechanical batteries and flywheels as energy storage are disclosed in U.S. Pat. No. 5,705,902; U.S. Pat. No. 8,134,264; U.S. Pat. No. 7,541,783; U.S. Pat. No. 6,753,619; U.S. Pat. No. 6,585,490; U.S. Pat. No. 8,698,365; and U.S. Pat. No. 6,122,993 which are incorporated herein by reference. The patents generally disclose how to provide an electric current to an array of magnets to provide rotation of a rotor within a housing unit, how to store energy, and discharge energy.

SUMMARY OF INVENTION

It would be desirable to provide a method to slow down a rotor of an electromechanical battery. It would be desirable to provide a method to safely stop a rotor of an electromechanical battery. It would be desirable to provide a way to absorb the energy stored by a spinning rotor if the electromechanical battery is subject to failure.

An electromechanical battery (EMB) can include a rotary member having a core cavity within the interior of the rotary member, a plurality of permanent magnets disposed on the surface defining the core cavity, and a core member disposed within the core cavity. The core member can include at least one magnet on the exterior surface of the core member for levitating the rotary member with respect to the core member. The core member can include a central chamber within the interior of the core member. The permanent magnets of the rotary member and the at least one magnet of the core member in combination with one another can levitate the rotary member with respect to the core member. The rotary member can be formed of a first material composition with a second material composition residing within at least one of the rotary member and the core member, or a combination of both the rotary member and the core member. When the second material composition contacts the first material composition, the rotary member is converted to a third material composition. The third material composition is characterized by energy absorption and resisting rotation of the rotary member.

An electromechanical battery (EMB) can include a rotary member having a core cavity within the interior of the rotary member. A plurality of permanent magnets can be disposed on a surface defining the core cavity. A core member can be disposed within the core cavity. The core member can include a magnetic located on an exterior surface of the core member and a central chamber within the interior of the core member. The permanent magnets of the rotary member and the magnetic of the core member can levitate the rotary member with respect to the core member. The rotary member can be formed of a silicone material, while boric acid resides within at least one of the rotary member and the core member, or combination of both of the rotary member and the core member. When the boric acid contacts the silicon material, the rotary member is converted to a polymeric silicon which absorbs the kinetic energy stored by the spinning rotary member.

The electromechanical battery of the disclosure is able to slow down the rotation of the rotor within the electromechanical battery by a second material composition or boric acid coming into contact with the rotary member. The rotation of the rotor is able to be stopped by the rotary member converting into a third material composition or a polymeric silicone. The third material composition or the polymeric silicone is able to absorb energy, such as kinetic energy, stored within the spinning rotary member.

DETAILED DESCRIPTION

Figure 1:
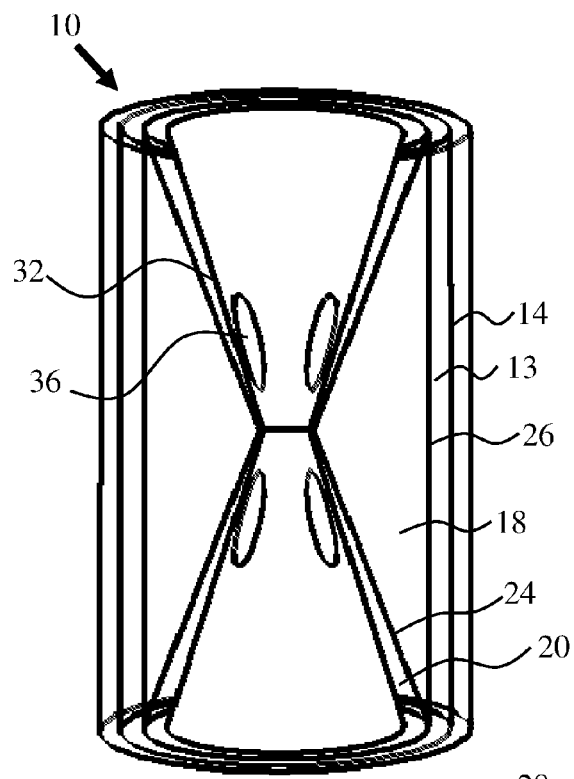
FIG. 1 illustrates a simplified schematic view of an electromechanical battery according to the present invention.

The explanations and illustrations presented herein are intended to acquaint others skilled in the art with the invention, its principles, and its practical application. The specific embodiments of the present invention as set forth are not intended as being exhaustive or limiting of the invention. The scope of the invention should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

An electromechanical battery (EMB) can be suitable for the storage of energy, regulation of energy, transmission of energy, or the like. The electromechanical battery can function to store kinectric energy. The electromechanical battery can function as a switched reluctance motor. The electromechanical battery can provide energy storage in a variety of applications and industries and can be suitable for the automotive industry, aerospace industry, nautical industry, and the like. The electromechanical battery can find specific utility in vehicles, such as cars, trucks, sport utility vehicles, or the like. The electromechanical battery can be a modular unit including a number of components, including a housing unit.

The electromechanical battery can include a housing unit. The housing unit can function to house one or more components of the electromechanical battery. The housing unit can function to provide a vacuum chamber for one or more components of the electromechanical battery. The vacuum chamber can reduce or eliminate the drag of one or more components within the housing unit. The housing unit can function to communicate with one or more components of the electromechanical battery, such as the rotary member, to cause rotation. The housing unit can have any shape, size, or configuration suitable to house one or more components, provide a vacuum chamber, and/or cause rotation. Preferably the housing unit can include an interior surface defining a hollow chamber. The hollow chamber can be a vacuum chamber. The hollow chamber can include an interior surface surrounding the chamber. One or more magnets, such as permanent magnets or electromagnets, can be embedded into the chamber.

The housing unit can include one or more housing magnets. The one or more housing magnets function to attract and repel one or more magnets associated with another component of the electromechanical battery. The one or more housing magnets can be permanently embedded into the interior surface of the housing unit. The one or more housing magnets can be arranged in an array along the perimeter and length of the interior surface. Preferably, the one or more housing magnets are arranged in a Halbach array, such as the Halbach array disclosed in U.S. Pat. No. 5,705,902, which is incorporated by reference herein in its entirety. The one or more housing magnets can be in communication with a power source, such as an electrical current provided from an electrical source. The power source functions to convert the polarity of the one or more housing magnets. By way of example and not limitation, a positive polarity magnet when supplied with power is converted to a negative polarity magnet. The continuous powering on and powering off of the power source provides the one or more housing magnets with continuously oscillating polarity. The continuously oscillating polarity can cause one or more magnets of another component to be continuously attracted and repelled, such as to push or rotate the one or more magnets or cause rotation of an object supporting the one or more magnets. For example, the continuous attraction and repulsion can result in rotation of a rotary member. The one or more housing magnets can cause another component of the electromechanical battery to achieve, spin, such as the rotary member. The one or more housing magnets can receive energy stored by another component of the electromechanical battery, such as energy discharged by the rotary member.

Figure 2:
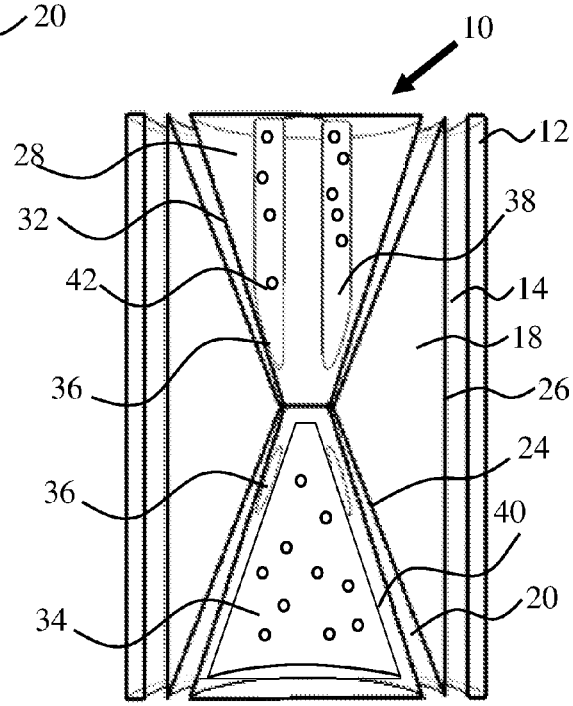
FIG. 2 illustrates a simplified schematic cross-section view of an electromechanical battery 10 of FIG. 1.

The electromechanical battery can include a rotary member. The rotary member can function as the power source of the electromechanical battery. The rotary member can function to store and regulate energy, such as kinetic energy. The rotary member can store energy through rotation. The rotary member can function as a flywheel. The rotary member can have any size, shape, and configuration suitable for storing and regulating energy, rotation, and/or functioning as a flywheel. By way of example and not limitation, as best seen in FIGS. 2 the rotary member can include a cylindrical shaped exterior surface and a pair of opposing frustoconical shaped interior surfaces located with small open ends in communication with one another. The rotary member can include an exterior surface. The rotary member is disposed within a hollow interior of the housing unit. Together the rotary member within the housing unit can form a complete switched reluctance electric motor. The rotary member can include a hollow interior. The hollow interior can be a core cavity surrounded by one or more core cavity walls. By way of example and not limitation, the core cavity can be a cylindrical cavity or a double-coned shaped cavity with a core cavity wall about a perimeter. The rotary member can rotate about an axis or another component of the electromechanical battery. The rotary member can be made of any material composition which can function with the aid of a second material composition to absorb energy, such as a silicone rotary member in combination with a boric acid. The rotary member can include at least one hollow portion, such as one or more chambers. The one or more chambers can extend between the rotary member exterior surface and the core cavity surface. The one or more chambers can include one continuous chamber about the interior of the rotary member or a plurality of chambers arranged in an array about the interior of the rotary member. The one or more chambers can be used for storing a second material composition. The rotary member can include at least one rotary magnet disposed or embedded into the exterior surface of the rotary member.

The rotary member can include at least one rotary magnet. The at least one rotary magnet functions to communicate with another component of the electromechanical battery to result in rotation of the rotary member. The at least one rotary magnet can include one or more rotary member magnets or a Litz wire. The at least one rotary magnet can include a plurality of rotary magnets arranged in an array about the exterior surface of the rotary member. The at least one rotary magnet can be distanced from the one or more housing magnets of the housing unit. The at least one rotary magnet results in rotation of the rotary member as the magnet is attracted to and repelled from the one or more housing magnets. The at least one rotary magnet can communicate with the one or more housing magnets to allow for energy transfer into the rotary member in the form of increased spinning movement of the rotary member with respect to the housing, and allows for transfer of energy out of the rotary member in the form of decreased spinning movement of the rotary member with respect to the housing. The at least one rotary magnet can communication with the one or more housing magnets to discharge the energy stored within the rotary member. The at least one rotary magnet can communication with the one or more housing magnets to discharge kinetic energy stored within the rotary member and to convert the discharged kinetic energy to electrical energy. The combination of housing magnets and rotary magnets cooperate to control rotation of the rotary member which corresponds to energy transfer into the rotary member as rotational speed increases and corresponds to energy transfer out of the rotary member as rotational speed decreases.

The rotary member can include one or more core cavity magnets. The one or more housing magnets function to attract and repel one or more magnets associated with another component of the electromechanical battery, such as one or more magnets associated with the core member. The one or more core cavity magnets can function to levitate one or more components of the electromechanical battery. The one or more core cavity magnets can be permanently embedded into an interior surface of the rotary member, such as the surface of the core cavity. The one or more core cavity magnets can be arranged in an array along the perimeter and length of the core cavity surface. The one or more core cavity magnets can be arranged as a permanent passive magnetic bearing. The one or more core cavity magnets can be arranged in a Halbach array, such as the Halbach array disclosed in U.S. Pat. No. 5,705,902, which is incorporated by reference herein in its entirety.

The electromechanical battery can include a core member. The core member can function to release a second material composition to chemically react with the first material composition of the rotary member to form a material composition characterized by energy absorption. The core member can function as a shaft about which the rotary member rotates. The core member can levitate the rotary member reducing frictional losses as the rotary member rotates. The core member can be located within the internal cavity defined by the rotary member. By way of example and not limitation, the core member can be located within the core cavity of the rotary member. The core member can have any size and shape configuration suitable for being disposed within the rotary member. The core member can be cylindrical shaped, double-cone shaped, or the like complementary in shape to the rotary member interior surface. The core member can include one or more hollow portions, such one or more chambers. The one or more chambers can be used for storing a second material composition. The core member can include one or more valves or openings to selectively release the second material composition. The core member can include at least one magnet for levitating the rotary member. The at least one magnet can be disposed or embedded in the exterior surface of the core member.

The core member can include at least one magnet for levitating the rotary member. The levitating magnet functions to communicate with another component of the electromechanical battery to result in levitation of the rotary member with respect to the core member. The levitating magnet can include one or more core member magnets or a Litz wire. The levitating magnet can be arranged in an array along the exterior surface of the core member. The levitating magnet can be spaced from the one or more core cavity magnets of the rotary member. The levitating magnet can result in levitation of the core member as the core cavity magnets are attracted to and repelled from the levitating magnet.

The electromechanical battery can include one or more chambers. The one or more chambers function to store a material composition. The one or more chambers function to prevent contact of the material composition with another component of the electromechanical battery, such as the rotary member. The one or more chambers can release the material composition under predetermined conditions. The one or more chambers can release the material composition to come into contact with another component of the electromechanical battery, such as the rotary member. The one or more chambers can include the one or more hollow portions of the rotary member, the one or more hollow portions of the core member, or both.

The one or more chambers can include one or more chamber walls. The chamber walls can prevent the material composition from escaping the one or more chambers. The chamber walls can release the material composition from the one or more chambers. By way of example and not limitation, at least a portion of the chamber walls can operate as valves by fracturing in response to impacts to release the material composition from the one or more chambers. The chamber walls can be any material suitable for preventing the material composition from escaping the one or more chambers and capable of easily fracturing to intentionally release the material composition from the one or more chambers. The one or more chamber walls can be any material which does not chemically react with the material composition within the one or more chambers. The chamber walls can be a thin membrane. The chamber walls can be made of a polymer, preferably made of a glass, and more preferably made of manufactured glass or safety glass. The chamber walls can fracture or break if a sufficient impact is felt within the electromechanical battery, by way of example and not limitation, if an external force of sufficient strength is applied to the electromechanical battery. An external force of sufficient strength can include a force sufficient to cause the rotary member and/or the core member to contact one another after overcoming magnetic forces providing levitation of the rotary member relative to the core member and/or the housing unit. By way of example and not limitation, if the rotary member collides with the interior surface of the housing unit, the one or more chamber walls can fracture.

The core member can include one or more valves. The one or more valves can function to release a material composition. The one or more valves can function to release a material composition such that the material composition comes into contact with the rotary member. For example, the one or more valves can release a material composition to contact an inside surface of the rotary member, such as the core cavity surface. The one or more valves can be any kind of valve suitable for releasing a material composition from the core member. By way of example and not limitation, the one or more valves can be dispensing valves, such as high speed valves. The one or more valves can be in communication with the one or more chambers. Preferably, the one or more valves are in fluid communication with the one or more chambers of the core member. The one or more valves can be in communication with the space, gap, or area between the core member and the rotary member. Preferably, the one or more valves are in communication with a gap between the core member exterior surface and the core cavity surface of the rotary member.

The electromechanical battery includes a first material composition. The first material composition can function to be a part of the rotary member or all of the rotary member. The first material composition can function to attain the rotational speeds necessary of the rotary member such that the rotary member is able to store energy, such as kinetic energy. The first material composition can be any material able to react with a second material composition, such as to quickly absorb energy. By way of example and not limitation, energy can be released by the rotary member when the energy is not able to be released back to another source, such as a motor or generator. Preferably, the first material composition is a silicone.

The electromechanical battery includes a second material composition. The second material can function to react with the first material composition to create a third material composition. The second material composition can be stored within one or more chambers of the electromechanical battery, such as one or more chambers of the rotary member, the core member, or both. The second material composition can be any material capable of reacting with the first material composition, such as to quickly absorb energy. By way of example and not limitation, energy released by the rotary member when the energy is not able to be released back to another source, such as a motor or generator. Preferably, the second material composition is boric acid. The boric acid can be in the form of pressurized boric acid aerosols.

The electromechanical battery can include a third material composition. The third material composition functions to absorb energy. The third material composition is created by the second material composition contacting the first material composition. By way of example and not limitation, the one or more chambers can release the second material composition such that the second material composition comes into contact with the first material composition of the rotary member, thereby converting the first material composition into a third material composition. When the second material composition contacts the first material composition, the rotary member can still be rotating within the housing unit at high rotation speeds. The second material composition can quickly react with the first material composition, such that the resulting third material composition changes the shape of the rotary member and results in the rotation stopping. Examples of changing shape can include melting, liquefying, dissolving, oozing, and the like. The reaction between the first material composition and the second material composition to create the third material composition is so quick that the energy released by the rotary member is prevented from being dispelled from the electromechanical battery. The third material composition can be any material composition capable of being created from the first material composition and the second material composition, but preferably is a silicone polymer.

The electromechanical battery of the disclosure can further include any one or more of the features described in this specification in any combination, including the preferences and examples listed in this specification, and including the following features. The core member can include one or more valves which fluidly connect the central chamber to the core cavity. The central chamber can include one or more walls which are fracturable and adjcant to the one or more valves which prevent fluid communication from the central chamber to the core cavity when intact. The one or more walls can be made of a polymeric membrane. The rotary member and the core member can be disposed with a vacuum enclosure of a housing unit. The housing unit can include a first plurality of electromagnets disposed on the vacuum enclosure's surface. The rotary member can include a second plurality of electromagnets disposed on the exterior surface of the rotary member which can be attracted to and repulsed by the first plurality of electromagnets, thereby rotating the rotary member within the housing unit. The rotation of the rotary member can provide for storage of kinetic energy within the rotary member. The walls can be fractured when an external force of sufficient strength is applied to the electromechanical battery. The fracture walls can allow the second material composition to travel from the central chamber through the one or more valves and into contract with the core cavity surface of the rotary member. The first material composition can include silicone. The second material composition can include boric acid. The boric acid can contact the silicone, which can create a silicone polymer. The second material composition can contact the first material composition, which can create a third material composition. The third material composition can absorb kinetic energy stored by the rotor. Electrical power can be provided by an electrical motor to initiate rotation of the rotary member within the housing. The one or more valves can be high speed valves. The permanent magnets of the rotary member can be arranged in a Halbach array. The core cavity and/or the core member can be shaped as a double cone. The core cavity and the core member can include a diameter which is narrower midway along the longitudinal axis.

Illustrative Embodiments

FIG. 1 illustrates a simplified schematic front view of an electromechanical battery 10 according to the teachings herein. The electromechanical battery 10 includes a housing unit 12. The housing unit 12 is cylindrical in shape and includes a hollow interior 13 with an interior surface 14. The hollow interior 13 is a vacuum chamber. Disposed within the hollow interior 13 of the housing unit 12 is a rotary member 18. The rotary member 18 includes an exterior surface 26 and is cylindrical in shape. The rotary member 18 includes a hollow interior, such as a core cavity 20. The core cavity 20 includes a core cavity surface 24. The core cavity 20 can have any shape, such as cylindrical or double-coned. By way of example and not limitation, as illustrated in FIG. 1, the core cavity 20 includes a double-coned shape. Disposed within the core cavity 20 is a core member 28. The core member 28 can include an exterior surface 32. The core member 28 can include one or more high speed valves 36 which can communicate an interior portion (not shown) or chamber of the core member 28 with respect to the core cavity surface 24 of the rotary member 18. The core member 28 is illustrated as a double-coned shape complementarily designed as the same shape as the core cavity 20.

FIG. 2 illustrates a simplified schematic cross-section view of an electromechanical battery 10 according to the teachings herein. The electromechanical battery 10 includes a housing unit 12 with a hollow interior 13 and an interior surface 14. Magnets 16 are connected onto or embedded into the interior surface 14 of the housing unit 12. A rotary member 18 is disposed within the hollow interior 13 of the housing unit 12. The rotary member 18 is made of a first material composition, by way of example and not limitation, such as silicone. The exterior surface 26 of the rotary member 18 can include magnets 19 (shown in FIG. 6). The magnets 16 (shown in FIG. 8) of the housing unit 12 can be provided with an electrical current. The electrical current can be powered on and off, thus changing the polarity of the magnets 16. By changing the polarity of the magnets 16, the magnets 19 connect to the exterior surface 26 of the rotary member 18 are attracted to and repelled, such that the rotary member 18 rotates within the hollow interior 13. A core member 28 can be disposed within a core cavity 20 of the rotary member 18. The core member 28 can house a second material composition 42, by way of example and not limitation, such as boric acid. The boric acid 42 can be contained within a central chamber 34 or in individual chambers 38. A membrane 40, by way of example and not limitation, such as a glass membrane can prevent the boric acid 42 from being released from the core member 28 via one or more valves 36. The membrane 40 can operate as a valve 36 by fracturing in response to an application of a force, thus allowing the boric acid 42 to be released and come into contact with the cavity surface 24 of the rotary member 18. When the second material composition 42, such as boric acid, comes into contact with the first material composition, such as silicone, the silicone material is converted into a third material composition, such as a silicone polymer. The third material composition is characterized by energy absorption. The third material can cause the rotary member to stop rotating within the housing unit as the silicone is converted to a silicone polymer. As a result of the conversion process, the rotary member looses shape and fractures absorbing energy.

Figure 3:
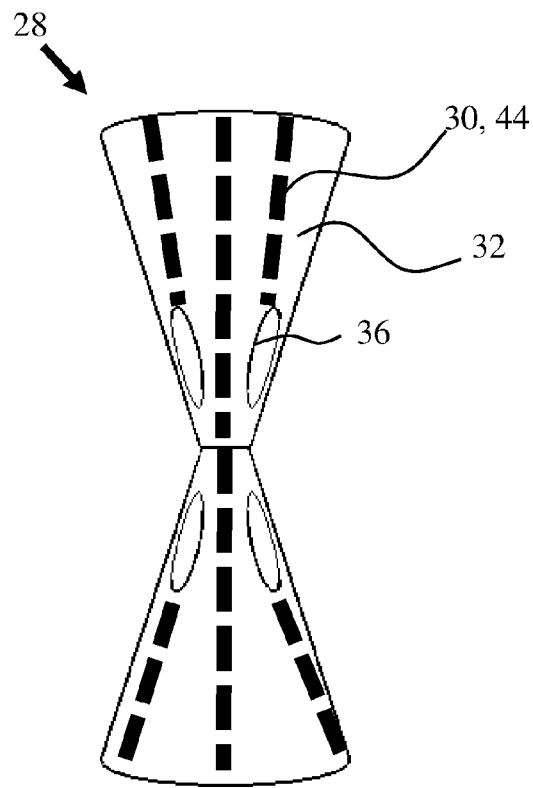
FIGS. 3 illustrates a simplified schematic view of the core member 28 of FIGS. 1-2.
Figure 4:
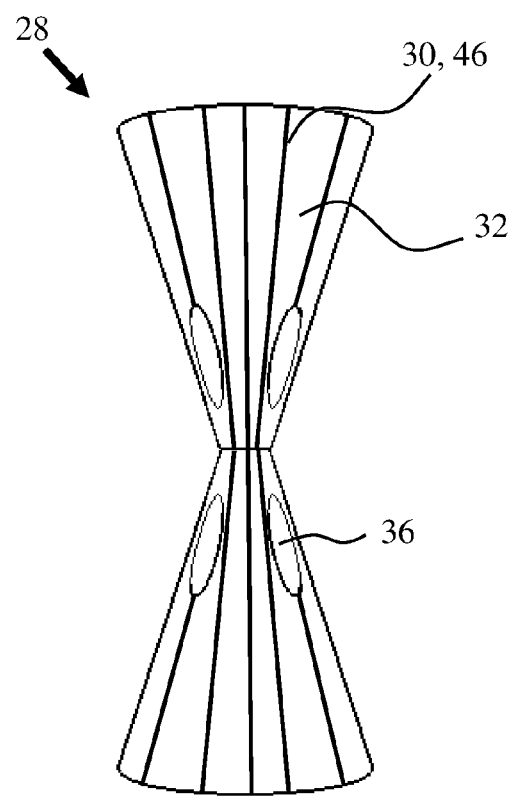
FIGS. 4 illustrates a simplified schematic view of the core member 28 of FIGS. 1-3.

FIGS. 3 and 4 illustrate simplified schematic front views of the core member 28 according to the teachings herein. The core member 28 can include a levitating magnet 30 connected to and/or embedded into the core member 28 exterior surface 32. The levitating magnet 30 can be permanent magnets 44 or Litz wire 44 arranged in an array. The core member 28 can include one or more valves 36.

Figure 5:
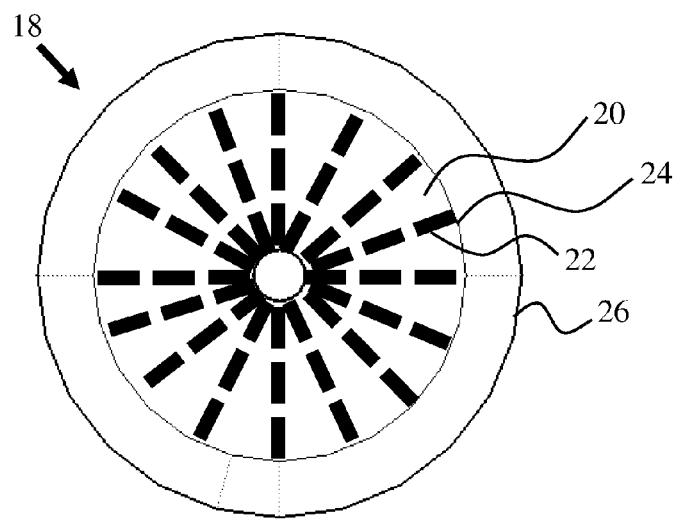
FIG. 5 illustrates a simplified schematic top view of a rotary member 18 of FIGS. 1-2.

FIG. 5 illustrates a simplified schematic top view of a rotary member 18 according to the teachings herein. The rotary member 18 can include a core cavity 20 with a core cavity surface 24. Magnets are arranged along the core cavity surface 24 in an array around the perimeter. The magnets 22 can interact with the levitating magnet 30 of the core member 28, such that the rotary member 18 is levitated with respect to the core member 28. The rotary member 18 can rotate about the core member 28.

Figure 6:
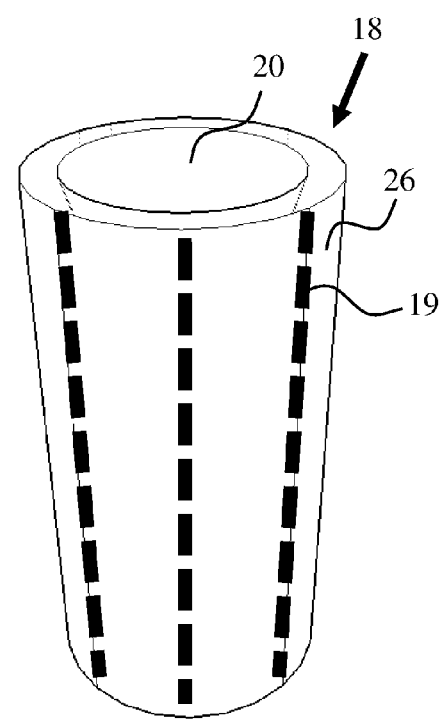
FIG. 6 illustrates a simplified schematic perspective view of a rotary member 18 of FIGS. 1-2 and 5.

FIG. 6 illustrates a simplified schematic perspective view of a rotary member 18 according to the teachings herein. The rotary member 18 can include an exterior surface 26. Permanent magnets can be arranged in an array 19 around the exterior surface 26 along the length of the rotary member 18.

Figure 7:
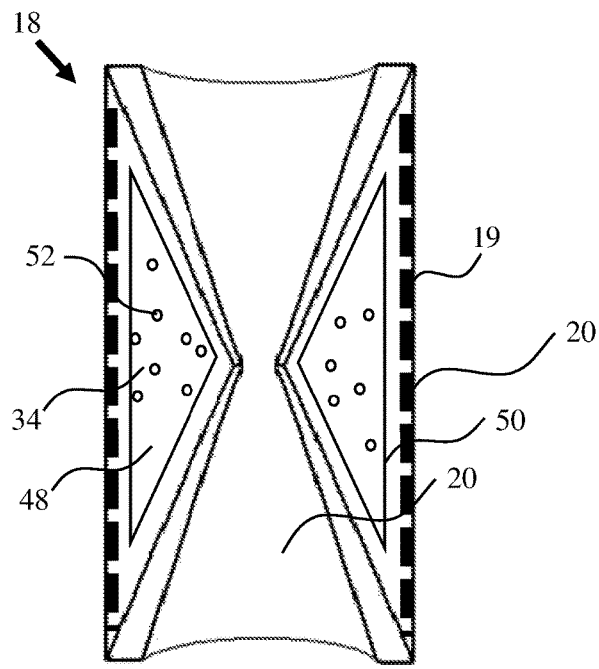
FIG. 7 illustrates a simplified schematic cross-section view of a rotary member 18 of FIGS. 1-2 and 5-6.

FIG. 7 illustrates a simplified schematic cross-section view of a rotary member 18 according to the teachings herein. The rotary member 18 can be made of a first material composition. The rotary member 18 can include an exterior surface 26. A core cavity 20 can be located within the interior of the rotary member 18 with core cavity walls 24. A rotary member chamber 48 can be located between the core cavity walls 24 and the exterior surface 26. A second material composition 52, such as boric acid, can be stored within the rotary member chamber 48. A membrane 50, such as a glass membrane, can separate the rotary member chamber 48 and the second material composition 52 from the remainder of the rotary member 18. The membrane 50 can be fractured such that the second material composition 52 can come into contact with the remainder of the rotary member 18. When the second material composition 52, such as the boric acid, comes into contact with the first material composition, such as silicone, the silicone is converted into a third material composition, such as a silicone polymer. The third material composition is characterized by energy absorption. The third material causes the rotary member to lose shape and fracture, hindering and resisting continued rotation of the rotary member within the housing unit as the silicone is converted to a silicone polymer.

Figure 8:
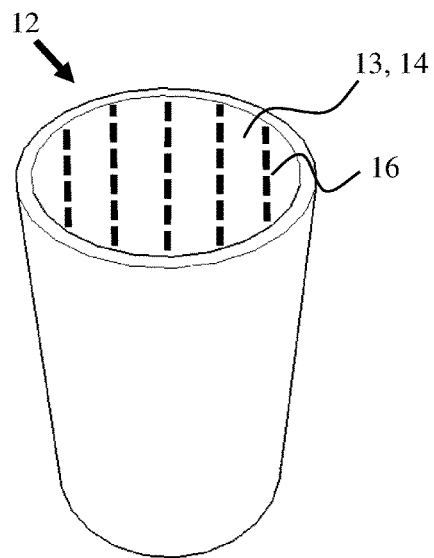
FIG. 8 illustrates a simplified schematic perspective view of a housing unit 12 of FIGS. 1-2.

FIG. 8 illustrates a simplified schematic perspective view of the housing unit 12 according to the teachings herein. The housing unit 12 can cylindrically shaped with a hollow interior 13. An interior surface 14 can encircle the perimeter of the hollow interior 13. Permanent magnets 16 can be embedded in the interior surface 14. The permanent magnets 16 can be arranged in an array across the length of the hollow interior 13. Electrical current (not shown) can be provided to the permanent magnets 16. By turning the electrical current on and off, the polarity of the magnets can be reversed.

What is claimed is:

1. An electromechanical battery comprising:
    a rotary member having a surface defining a core cavity within an interior of the rotary member, the rotary member formed at least partially of a first material composition;
    a plurality of permanent magnets disposed on the surface of the core cavity of the rotary member;
    a core member disposed within the core cavity of the rotary member, the core member having an exterior surface and at least one central chamber within an interior of the core member;
    a levitating magnet connected to the exterior surface of the core member, a combination of the plurality of permanent magnets associated with the rotary member and the levitating magnet associated with the core member levitating the core member within the rotary member; and
    a second material composition residing within at least one central chamber of the core member, the second material composition reactive with the first material composition to convert the first material composition to a third material composition, wherein the third material composition is characterized by energy absorption properties resisting continued rotation of the rotary member.

2. The electromechanical battery of claim 1 further comprising:
    at least one valve fluidly connecting the at least one central chamber to the core cavity.

3. The electromechanical battery of claim 1 further comprising:
    at least one fracturable wall preventing fluid communication from the at least one central chamber to the core cavity when intact.

4. The electromechanical battery of claim 3, wherein the at least one fracturable wall is made of a polymeric membrane.

5. The electromechanical battery of claim 3 further comprising:
    a housing unit having an interior surface defining a vacuum chamber enclosing the rotary member and core member; and
    a first plurality of electromagnets supported on the interior surface of the vacuum enclosure.

6. The electromechanical battery of claim 5, wherein the rotary member includes a second plurality of electromagnets disposed on the exterior surface of the rotary member, the second plurality of magnets attracted to and repulsed by the first plurality of electromagnets to cause rotation of the rotary member within the housing unit.

7. The electromechanical battery of claim 6, wherein rotation of the rotary member provides for storage of kinetic energy within the rotary member.

8. The electromechanical battery of claim 3, wherein the at least one fracturable wall allows fluid communication between the at least one central chamber and the core cavity in response to being fractured by an external force of sufficient strength applied to the electromechanical battery.

9. The electromechanical battery of claim 8, wherein the at least one fracturable wall operates as a valve to allow the second material composition to travel from the central chamber into contact with the core cavity surface of the rotary member when fractured.

10. The electromechanical battery of claim 1, wherein the first material composition comprises a silicone material.

11. The electromechanical battery of claim 10, wherein the second material composition comprises a boric acid material, such that when the boric acid material contacts the silicone material, a silicone polymer is created as a result of the chemical reaction.

12. The electromechanical battery of claim 6, wherein an external power source provides initiate rotation of the rotary member within the housing.

13. The electromechanical battery of claim 1, wherein the permanent magnets of the rotary member are arranged in a Halbach array.

14. The electromechanical battery of claim 1, wherein the core cavity and the core member are shaped as a double-cone.

15. The electromechanical battery of claim 14, wherein the core cavity and the core member include a narrower diameter midway along a longitudinal axis.

16. An electromechanical battery comprising:
a rotary member formed at least in part of silicone material and having an interior surface defining a core cavity within the interior of the rotary member;
a plurality of permanent magnets disposed on the interior surface defining the core cavity;
a core member having an exterior surface disposed within the core cavity and defining at least one central chamber;
at least one levitating magnet supported on the exterior surface of the core member, the core member having an interior surface defining a central chamber within an interior of the core member, the permanent magnets of the rotary member and the at least one levitating magnet of the core member causing the core member to levitate within the rotary member; and
a boric acid material residing within at least one of the rotary member and the core member, such that the boric acid material is released into contact with silicon material of the rotary member, causing the rotary member to be converted to a polymeric silicon allowing absorption of kinetic energy stored by the rotary member.

17. The electromechanical battery of claim 16, wherein the core member includes at least one valve fluidly connecting the central chamber to the core cavity.

18. The electromechanical battery of claim 17, wherein the at least one central chamber includes at least one fracturable wall operating as a valve to prevent fluid communication from the at least one central chamber to the core cavity when intact and to allow fluid flow communication from the at least one central chamber to the core cavity when fractured.

19. The electromechanical battery of claim 18, wherein the at least one fracturable wall allows fluid communication between the at least one central chamber and the core cavity in response to being fractured by an external force of sufficient strength applied to the electromechanical battery.

20. The electromechanical battery of claim 18, wherein the at least one fracturable wall operates as a valve to allow the second material composition to travel from the central chamber into contact with the core cavity surface of the rotary member when fractured.

* * * * *